(12) United States Patent
Schlosser et al.

(10) Patent No.: US 11,813,813 B2
(45) Date of Patent: Nov. 14, 2023

(54) APPARATUS FOR TRANSPORTING COMPRESSED AIR AND/OR SEALANT IN A VEHICLE TIRE AND PORTABLE/TRANSPORTABLE SYSTEM FOR SEALING AND INFLATING VEHICLE TIRES

(71) Applicant: Continental Reifen Deutschland GmbH, Hannover (DE)

(72) Inventors: Florian Schlosser, Barsinghausen (DE); Rainer Detering, Neustadt am Rbge. (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 17/755,649

(22) PCT Filed: Oct. 12, 2020

(86) PCT No.: PCT/EP2020/078640
§ 371 (c)(1),
(2) Date: May 4, 2022

(87) PCT Pub. No.: WO2021/099028
PCT Pub. Date: May 27, 2021

(65) Prior Publication Data
US 2022/0388260 A1    Dec. 8, 2022

(30) Foreign Application Priority Data
Nov. 19, 2019  (DE) ..................... 10 2019 217 775.1

(51) Int. Cl.
B29C 73/16    (2006.01)
(52) U.S. Cl.
CPC ................................. B29C 73/166 (2013.01)

(58) Field of Classification Search
CPC .................................................... B29C 73/166
(Continued)

(56) References Cited

U.S. PATENT DOCUMENTS

| | | | |
|---|---|---|---|
| 8,459,150 B2 * | 6/2013 | Yoshida | B29C 73/166 81/15.3 |
| 2003/0056851 A1 * | 3/2003 | Eriksen | B29C 73/166 141/105 |

(Continued)

FOREIGN PATENT DOCUMENTS

| | | |
|---|---|---|
| CN | 203836455 U | 9/2014 |
| CN | 106809187 A | 6/2017 |

(Continued)

OTHER PUBLICATIONS

International Search Report dated Feb. 25, 2021 of International Application PCT/EP2020/078640 on which this application is based.

*Primary Examiner* — Timothy P. Kelly
(74) *Attorney, Agent, or Firm* — Richard A. Wolf; Gregory Adams

(57) ABSTRACT

The invention relates to a device (1) for transporting compressed air and/or sealant into a pneumatic vehicle tire, comprising at least one gas connection (3) for connecting to at least one compressed-air source (24), at least one sealant connection (2) for connecting to at least one sealant container (6), at least two channels, wherein a first channel is a sealant transport channel (4) for transporting a sealant dispersion from the sealant connection into a pneumatic vehicle tire and a second channel is a compressed-air transport channel (5) for transporting compressed air to the sealant connection or to the sealant transport channel, wherein the sealant dispersion comprises sealant particles and compressed air as dispersion matrix, characterized in that the device has a movable switchover element (7), wherein the movable switchover element can be moved in (Continued)

the direction of the sealant connection by means of a compressed-air flow coming from the gas connection and has a severing portion (8) for severing a seal. The invention also relates to a portable/transportable system (38) and to corresponding methods and corresponding uses.

16 Claims, 7 Drawing Sheets

(58) Field of Classification Search
USPC .................................................. 141/38, 329
See application file for complete search history.

(56) References Cited

U.S. PATENT DOCUMENTS

| | | | |
|---|---|---|---|
| 2010/0186849 A1* | 7/2010 | Yoshida | B29C 73/166 |
| | | | 141/38 |
| 2011/0155280 A1 | 6/2011 | Eckhardt | |
| 2014/0190590 A1 | 7/2014 | Taniguchi et al. | |
| 2014/0209208 A1 | 7/2014 | Taniguchi et al. | |
| 2014/0366981 A1 | 12/2014 | Taniguchi et al. | |
| 2015/0000786 A1 | 1/2015 | Taniguchi et al. | |
| 2018/0333927 A1 | 11/2018 | Spindler et al. | |

FOREIGN PATENT DOCUMENTS

| | | |
|---|---|---|
| DE | 10106468 B4 | 8/2002 |
| DE | 102007003667 A1 | 7/2008 |
| DE | 102015119917 A1 | 5/2017 |
| EP | 1621325 A1 | 2/2006 |
| EP | 2746032 A1 | 6/2014 |
| EP | 2746033 A1 | 6/2014 |
| EP | 2792473 A1 | 10/2014 |
| EP | 2810767 A1 | 12/2014 |
| EP | 2338671 B1 | 4/2018 |
| WO | 02066236 A1 | 8/2002 |
| WO | 2009052576 A1 | 4/2009 |
| WO | 2013042448 A1 | 3/2013 |
| WO | 2013042545 A1 | 3/2013 |
| WO | 2013103055 A1 | 7/2013 |
| WO | 2013114751 A1 | 8/2013 |
| WO | 2017063105 A1 | 4/2017 |

* cited by examiner

APPARATUS FOR TRANSPORTING COMPRESSED AIR AND/OR SEALANT IN A VEHICLE TIRE AND PORTABLE/TRANSPORTABLE SYSTEM FOR SEALING AND INFLATING VEHICLE TIRES

The invention relates to a device for transporting compressed air and/or sealant into a pneumatic vehicle tire.

The invention also relates to a portable/transportable system and to corresponding methods and corresponding uses.

Repair kits or puncture kits for the temporary repair of the tire, which contain a compressor, a distributor device, a sealant, the corresponding connecting hoses and the necessary cable connections for the supply of energy and also operator control elements, and thus constitute a permanently usable and complete repair kit as a substitute for the spare wheel, have already been known for some time.

In conventional systems, the punctured tire is at least partially refilled with air from a compressor counter to the outflow of air through the leak present in the tire. During this refilling of the punctured tire with compressed air from the compressor, the puncture assistance system is in what is known as the compressed-air mode. In such known puncture assistance systems, after the tire has been at least partially refilled, sealant is subsequently conveyed into the damaged tire from a corresponding sealant container. During this delivery of sealant into the punctured tire, the puncture assistance system is in what is known as the sealant mode. However, the conveying of the sealant into the damaged tire can only take place once particular prerequisites, for example a particular minimum pressure in the at least partially refilled tire, have been met.

The leak can be completely sealed only after the sealant-filled punctured tire has been inflated to a stable minimum pressure and the inflated tire has subsequently traveled slowly onward.

As already explained above, the introduction of the sealant into the tire cannot take place from the outset and in previous systems frequently has to be actuated manually by the user. To this end, the usually inexperienced user using previous puncture kit systems in an unfamiliar situation has to connect various parts together in a complicated manner or start the delivery of the sealant into the tire while applying a significant force. In the latter case, in particular the risk of insufficient application of force arises, and this can result in insufficient sealing of the punctured tire.

Devices for transporting compressed air and/or sealant into a pneumatic vehicle tire are also referred to in the prior art as "removal element", "distributor device", "device for introducing air and/or sealant into a tire", "device for dispensing tire sealant from a container", "bottle cap", "receiving unit" and "extraction unit".

Various distributor devices are known from the prior art:

DE 102015119917 A1 discloses a "method for dispensing a means for sealing an inflatable article, [ . . . ] [wherein], in a first position of the valve (6), the inlet (7) and outlet (8) are connected together and, in a second position of the valve (6), a connection between the inlet (7) and the container (5) and the container (5) and the outlet (8) is established, characterized in that the container (5) is fixed to the valve (6) only when there is a demand for sealant in or at a receptacle (23) of the valve (6)" (see claim 1). The advantage of this is said to be "that the sealant lasts for longer in the container. This is because, when it is not needed, it is not opened and therefore no air and/or contaminants enter the container" (see paragraph [0013]).

EP 2338671 B1 discloses a "device (10) for introducing air and/or sealant into a tire [ . . . ], characterized in that the same hose (30) is provided for the connection between the pressure-generating means (18) and the tire to be filled, for the one part, and between the outlet of the container (14) and the tire to be filled, for the other part, wherein the switchover valve (40, 40') is configured, depending on its switched position, to provide either a direct fluidic connection between the pressure-generating means (18) and the hose (30) or a fluidic connection between the pressure-generating means (18) and the inlet of the container (14), for the one part, and between the outlet of the container (14) and the hose (30), for the other part" (see claim 1).

DE 10106468 B4 discloses a "device for dispensing tire sealant from a container (1) to which a removal element (2.1 to 2.3) for dispensing tire sealant is assigned, wherein the removal element (2.1 to 2.3) has a valve (12.1 to 12.3) and the valve has an inlet (3) and an outlet (4), a compressed-air source (6) is connectable to the inlet (3) and a connecting line (8) for connecting to a tire (9) is connectable to the outlet (4), and, in a first setting of the valve (12.1 to 12.2), the inlet (3) and outlet (4) are able to be connected together via at least one bypass and, in a second position of the valve, a connection between the inlet (3) and the container (1) and the container (1) and the outlet (4) is established" (see claim 1). The object here is said to be for "the device to be producible cost-effectively, to be easy to use and to be able to be accommodated in any vehicle with the least possible installation space" (see paragraph [0007]).

CN 106809187 A discloses an inflation and tire repair kit having a rotatable unit which controls the gas pumping and tire repair functions in order to avoid failure as a result of incorrect operation (cf. abstract).

WO 2017063105 A1 discloses a "bottle-cap" with a rotatable flow path switching element, wherein the switching element has two flow paths and one of the two flow paths is configured in an arc-shaped manner (cf. claim 1). It is said to be advantageous that the "bottle-cap" is able to be combined with a large number of compressors (cf. [0020]).

WO 2013114751 A1 discloses a tire repair kit having a switching cap which, when it is attached to the kit housing, brings about fully manual switching over from one flow passage to another flow passage of the kit (cf. claim 1). The kit is thus said to improve operability and even smaller embodiments of the kit are said to be possible (cf. [0029]). In addition, it is said to be possible to prevent sealant from escaping from the sealant vessel during storage (cf. [0030]).

WO 2013103055 A1 discloses a tire repair kit having switching means which, when pushed down into a receiving mouth portion of the kit housing, bring about a switchover from one flow passage to another flow passage of the kit (cf. claim 1). The kit is thus said to improve operability and even smaller embodiments of the kit are said to be possible (cf. [0017]). In addition, it is said to be possible to prevent sealant from escaping from the sealant vessel during storage (cf. [0018]).

CN 203836455 U discloses a tire repair bottle having a fluid flow direction switching unit and having a plurality of inputs and outputs, which is said to be easy to use (cf. abstract).

WO 2013042448 A1 discloses a repair kit comprising an extraction cap and a compressor, wherein the cap and the compressor have a coupling nozzle and a nozzle receiver (cf. claim 1). The kit is said to be better protected against the escape of the sealant during storage and against the inner lid not coming off when required (cf. [0022]).

WO 2013042545 A1 discloses a repair kit having a "sheath pipe" which is arranged coaxially around a nozzle pipe and can be displaced in the longitudinal direction on the nozzle pipe and thus opens a second flow channel (cf. claim 1 and claim 2). The kit is said to be better protected against the escape of the sealant during storage and against the inner lid not coming off when required (cf. [0022]).

A problem addressed by the invention consists in providing a device for transporting compressed air and/or sealant into a pneumatic vehicle tire, in particular a portable/transportable system for sealing and inflating pneumatic vehicle tires, said system being easier for an inexperienced user to operate, in particular configured such that, prior to the use of the device or of the system, individual parts of the device or of the system need to be connected together only once or at best not at all, and/or the user needs to intervene only once or at best not at all during operation of the device or of the system.

This problem is solved according to the invention by a device for transporting compressed air and/or sealant into a pneumatic vehicle tire, comprising:

at least one gas connection for connecting to at least one compressed-air source, at least one sealant connection for connecting to at least one sealant container, at least two channels, wherein a first channel is a sealant transport channel for transporting a sealant dispersion from the sealant connection into a pneumatic vehicle tire and a second channel is a compressed-air transport channel for transporting compressed air to the sealant connection or to the sealant transport channel, characterized in that the device has a movable switchover element, wherein the movable switchover element can be moved in the direction of the sealant connection by means of a compressed-air flow coming from the gas connection and has a severing portion for severing a seal.

A great achievement of the present invention is that it has been discovered that, with an above-described switchover element in conjunction with an above-described severing portion on the switchover element of a device according to the invention, a puncture assistance system can be provided in which a user of the puncture assistance system with a device according to the invention is no longer forced to connect various parts together in order to switch over from the compressed-air mode to the sealant mode, and at the same time no longer needs to apply significant force or even any force at all in order to switch over from the compressed-air mode to the sealant mode.

Therefore, the use of a puncture assistance system is much easier for the user when a device according to the invention as described above or below is used in the puncture assistance system used. In addition, it is possible, with a device according to the invention, to provide a one-piece puncture assistance system and thus to avoid the complicated connection of a plurality of parts of a puncture assistance system. This too makes it easier for the user of a puncture assistance system to use it.

The above-described great simplification on account of a one-piece puncture assistance system is in particular advantageous compared with the above-described multi-piece puncture assistance systems according to the documents EP 2746032 A1, EP 2746033 A1, EP 2 792473 A1 and EP 2810767 A1, in which the switchover from the compressed-air mode to the sealant mode is achieved using a different plug system compared with the present invention.

In addition, a device according to the invention as described above makes it possible that, in spite of the presence of only three connections, namely the connection to the tire with the puncture, a gas connection and a sealant connection, the compressed air produced by the compressed-air source does not need to be switched back and forth between different transport channels. The simplified structure of a device according to the invention as described above or below represents in particular an advantage over the subjects of the documents CN 203836455 U, EP 2746032 A1, EP 2746033 A1 and EP 2810767 A1, in which the receiving unit has more than three connections.

Preferable, therefore, is a device according to the invention as described above or below, wherein the device according to the invention, in addition to the sealant connection and the gas connection and the connection to the tire on the sealant transport channel, does not have any further connection and/or is suitable for the production of a one-piece system for sealing and inflating pneumatic vehicle tires.

The above-described advantages are achieved in that a seal on the sealant container can be severed by means of the movable switchover element of a device according to the invention, while the movable switchover element of the device according to the invention can be used by exploiting the compressed air from the compressed-air source to actuate the sealant mode. The movement of the switchover element of a device according to the invention can be actuated in this case in various ways. For example, the pressure in the compressor could be increased and thus the movement of the switchover element actuated. Further possibilities are the electronically or manually manipulable holding unit described below, which can be used by means of an actuating element for manually releasing or by means of an electronic open-loop or closed-loop control unit described below, in order to actuate said movement of the switchover element. A seal which can be severed by means of the severing portion of the switchover element of a device according to the invention can be attached both to the sealant connection of a device according to the invention and to the connection of a sealant container which can be connected to the sealant connection of a device according to the invention. The latter is advantageous since replacement of the sealant container, which is usually provided with an expiration date for the contained sealant, is simpler compared with an embodiment in which the seal is located in the sealant connection of the device according to the invention.

In the context of the present invention, the movable switchover element is preferably fitted in a device according to the invention and provided so as to sever a seal on the sealant connection of a device according to the invention or on the sealant container. In the context of the present invention, the severing portion of the movable switchover element of a device according to the invention preferably comprises at least one edge for severing a seal and/or at least one corner for severing a seal, said edge and/or corner being fitted on the severing portion of the movable switchover element such that, during a movement of the switchover element in the direction of the sealant connection, it can sever a seal on the sealant connection of a device according to the invention or on the sealant container. Examples of an edge for severing a seal or a corner for severing a seal are those which are used on common household knives.

The use of a seal for releasing the sealant and for transferring the sealant into a tire also has the advantage that it is easier to produce the puncture assistance system since the device according to the invention does not have to be equipped with a sealant container from the outset and also has the advantage that the sealant container can be replaced without problems after the expiration date of the sealant. In some solutions known from the prior art, by contrast, when the sealant container is replaced, the removal unit of the one assistance system also has to be removed, this having a greater impact on the environment.

In the context of the present invention, the term "tire" describes in particular a pneumatic tire and a pneumatic vehicle tire.

In the context of the present invention, the terms "leak" and "puncture" are used synonymously.

In the context of the present invention, the sealant transport channel of a device according to the invention is suitable in particular for transporting a sealant dispersion from the sealant connection into a pneumatic vehicle tire, wherein the sealant dispersion comprises sealant particles and compressed air as continuous phase and dispersion matrix. In principle, the sealant transport channel should, however, also be suitable for transporting flowing liquid sealant, for example in the form of large drops or bulk volumes, which fill the entire inside diameter of the sealant transport channel.

Preference is given to a device according to the invention as described above or as described as preferred above, wherein the movable switchover element is arranged in the compressed-air transport channel and/or has one, two, three, four, five or more than five air-flow baffle elements, wherein the one or more air-flow baffle elements are suitable for at least partially deflecting the flow direction, extending substantially parallel to the direction of movement of the switchover element, of compressed air in the compressed-air transport channel or to deflect it such that, in the compressed-air transport channel, the movable switchover element is moved by means of compressed air coming from a compressed-air source in the direction of the sealant connection.

An advantage of the above-described aspect of the present invention is that the more air-flow baffle elements the switchover element of a device according to the invention has, the more reliably a seal can be severed by the severing portion of the movable switchover element. Three examples of the many possible embodiments of said air-flow baffle elements can be formations protruding from the surface of the movable switchover element, for example hooks or branch-like formations, or O-rings.

Particular preference is given to a device according to the invention as described above or as described as preferred above, wherein the movable switchover element is at least substantially in the form of a hollow cylinder and has an internal channel, wherein the switchover element forms, along the vertical extent of the hollow cylinder, in cooperation with the inner wall of the compressed-air transport channel, a plurality of portions, wherein the plurality of portions comprise at least the following portions:
  a bypass portion for conducting compressed air from the compressed-air transport channel directly into the sealant transport channel,
  and
  an activation portion, wherein the activation portion is designed to use compressed air coming from the gas connection to move the switchover element in the direction of the sealant connection.

Preferably, the above-described three portions, namely the severing portion, bypass portion and activation portion, are fitted on the movable switchover element of a device according to the invention such that the part of the movable switchover element which is located closest to the sealant connection in a device according to the invention is the severing portion of the movable switchover element, wherein then, away from the severing portion of the device according to the invention, the bypass portion follows the severing portion and then the activation portion on the movable switchover element.

An advantage of the above-described aspect of the present invention is that, with the above-described form of a movable switchover element of a particularly preferred device according to the invention as described above, on the one hand a seal can be severed even more reliably compared with other embodiments according to the invention. On account of the internal channel of the hollow cylinder, the above-described form of a movable switchover element additionally allows as large a quantity of air as possible to be able to be conveyed into the sealant container after the seal has been severed, in order to deliver the sealant from the sealant container into the punctured tire with as high a pressure as possible. The above-described pressure increased by means of the use of an internal channel has the result that at least a part of the sealant, together with a part of the compressed air, passes into an above-described dispersion and can therefore better seal the leaks in the tire, in particular leaks in the tire that are difficult for the sealant to reach.

In particular compared with the fully manual switchover of the puncture assistance system, which is disclosed in document EP 2746032 A1 in FIG. 2 and the description of this figure, the above-described activation portion of the movable switchover element represents a device according to the invention, since in EP 2746032 A1, the compressed-air flow is conducted only from one connection (see reference sign 12) to the opposite connection (see reference sign 12) and the compressed air is not used to move an element of the removal unit. The exploitation of the compressed-air flow to switch over from the compressed-air mode to the sealant mode of a puncture assistance system is therefore a technical effect of the present invention.

In the context of the present invention, the expression "conducting compressed air from the compressed-air transport channel directly into the sealant transport channel" means in particular that the compressed air is not conducted into the sealant container before passing through the sealant transport channel and therefore does not come into contact with sealant.

In the context of the present invention, the above-described portions are preferably separated by O-rings, wherein the O-rings act in particular as above-described air-flow baffle elements. However, the activation portion can advantageously comprise flow baffle elements of other types as described above.

Particular preference is also given to a device according to the invention as described above or as described as preferred above and in particular as described as particularly preferred above, wherein the switchover element forms, along the vertical extent of the hollow cylinder, in cooperation with the inner wall of the compressed-air transport channel, at least one further portion, wherein the one further portion is formed such that compressed air coming from the gas connection can be conducted through the internal channel of the switchover element in the form of a hollow cylinder and subsequently in the direction of the sealant connection or into a sealant container.

An advantage of the above-described aspect of the present invention is that it ensures that, after the movement of the movable switchover element and the severing of a seal, the compressed-air stream, also compressed air, comes into contact with the sealant in the sealant container after passing through the internal channel. Subsequently, the sealant is pressed by the sustained compressed-air flow out of the internal channel of the movable switchover element of a device according to the invention into the sealant transport channels and transported onward to the tire with the puncture. In the sealant transport channel and in the tire with the puncture, the sealant with the compressed air can advantageously also be present in the form of a sealant dispersion as described above, since sufficient pressure can be built up as a result of being conducted through the internal channel. The higher the pressure with which the compressed air flows into the sealant container, the smaller the sealant particles and the better the sealing action of the sealant dispersion in the punctured tire.

In contrast to the above-described conducting of the compressed-air flow through the internal channel of the movable switchover element, it would theoretically also be possible for the compressed air coming from the gas connection to have flowed around the movable switchover element outside the switchover element in order to pass into the sealant container. This would bring about a less favorable flow of the compressed air and of the sealant, however, with the result that the time for transferring the sealant into the tire with the puncture is unnecessarily increased. This is also an advantage of the use of an internal channel in a device according to the invention as described above.

Particularly preferably, the internal channel of a movable above-described switchover element of a device according to the invention should therefore be free of other elements, for example a supporting unit (cf. "support portion", reference sign 19, in FIG. 3 and the description of this figure in EP2792473 A1), which would not have the above-described advantages when used in a device according to the invention.

Particular preference is also given to a device according to the invention as described above or as described as preferred above and in particular as described as particularly preferred above, wherein
  a first sealing element, in cooperation with the internal wall of the compressed-air transport channel, is designed such that no compressed air passes from the bypass portion into the activation portion of the switchover element,
  and/or
  the first sealing element and/or a second sealing element, in cooperation with the internal wall of the compressed-air transport channel, is designed such that compressed air is conducted from the activation portion and/or from said further portion only through the internal channel of the switchover element to the sealant connection.

An advantage of the above-described aspect of the present invention is that reliable switching over from the compressed-air mode into the sealant mode takes place in a device according to the invention.

Preference is given to a device according to the invention as described above or as described as preferred above, wherein the severing portion of the switchover element is arranged on the switchover element and provided, on account of a movement of the movable switchover element in the direction of the sealant connection, so as to sever a seal on the sealant connection or a seal on a sealant container fastened to the sealant connection.

An advantage of the above-described aspect of the present invention is that the switching over from the compressed-air mode into the sealant mode can be carried out without the compressed-air flow being diverted through various compressed-air channels, and is brought about by the compressed-air flow itself. In particular the latter facilitates the knowledge and the force that a user needs to apply. In particular compared with the "push down" solution as described in document EP 2792473 A1 (cf. FIG. 4 and the description of this figure), when using a device according to the invention, the user does not need to know to what extent or how long they need to apply a particular force since the force to be applied for switching over from the compressed-air mode into the sealant mode is brought about by means of the compressed-air flow.

Preference is given to a device according to the invention as described above or as described as preferred above, wherein the sealant connection is sealed with a seal, wherein the seal of the sealant connection is designed to be severed in the event of a movement of the movable switchover element, actuated by means of compressed air coming from a compressed-air source, in the direction of the sealant connection.

Preference is given to a device according to the invention as described above or as described as preferred above, wherein the device has an electronically or manually manipulable holding unit for holding the movable switchover element, wherein preferably the holding unit is designed such that it can be manipulated such that the movable switchover element can be released from the holding unit and after it has been released, a movement of the movable switchover element, brought about by means of compressed air from a compressed-air source, can be actuated, wherein the movement brought about is particularly preferably suitable for severing a seal on the connection of a sealant container fastened to the sealant connection or a seal on the sealant connection by means of the severing portion for severing a seal.

An advantage of the above-described aspect of the present invention is that, only with low force application, the user needs to release the holding unit and the holding unit, after being released, severs the seal as a result of the force of the compressed-air flow from the compressor and thus actuates the sealant mode. A manually manipulable holding unit is described below in conjunction with an actuating element. An electronically manipulable holding unit can be released for example by a corresponding command of an open-loop control unit or a closed-loop control unit. The on-board computer, for example, of a vehicle on which the punctured tire is fastened can be used as the open-loop control unit or closed-loop control unit. On account of the low force that is required in order to release the holding unit of a device according to the invention as described above or as described as preferred above, a voltage source that usually follows in a puncture assistance system can provide this force without problems.

This represents in particular an advantage compared with the subject matter of the document EP2792473 A1, see FIG. 4 and the description of this figure, in which the entire sealant unit ("bottle unit 6", see [0044] and FIGS. 4 and 5) has to be moved in order to switch from the compressed-air mode into the sealant mode. This results in a more reliable sealing behavior when using a device according to the invention compared with the subject matter of the document EP2792473 A1.

On account of the above statements, a device according to the invention as described as preferred above or a system according to the invention as described below is preferred, wherein the compressed-air source is driven by means of a voltage source in the range from 5 to 50 volts. An example of such a voltage source is for example the power connection for a cigarette lighter of a conventional vehicle. In another embodiment, the voltage source may be 10 to 15 volts.

It is very particularly preferred here when the holding unit can be manipulated electronically in a device according to the invention as described above and the electronic manipulation is carried out by an open-loop and/or closed-loop control unit which evaluates signals from a pressure sensor to measure an internal pressure in a punctured tire in order to carry out the electronic manipulation of the holding unit of a device according to the invention. Such an open-loop and/or closed-loop control unit can be for example the on-board computer of a vehicle, which is connected to the pressure sensors in the tire and thus automatically brings about the switchover from the compressed-air mode to the sealant mode in a user-friendly manner.

Preference is given to a device according to the invention as described above or as described as preferred above, wherein the device has an electronically or manually manipulable holding unit for holding the movable switchover element in a predefined starting position and the holding unit is preferably configured such that the holding unit can hold the movable switchover element in the predefined starting position while the switchover element is flowed around by compressed air from a compressed-air source, wherein particularly preferably the predefined starting position of the movable switchover element is within the compressed-air transport channel and/or at the distributor-side end of the compressed-air transport channel.

Particular preference is given to a device according to the invention as described above or as described as preferred above, wherein the device has an actuating element for manually releasing the hold of the holding unit and in order to bring about a movement of the movable switchover element from the starting position to the sealant connection, wherein the actuating element, the holding unit and the movable switchover element are preferably designed such that, after the releasing of the actuating element, a movement of the movable switchover element, brought about by means of compressed air from a compressed-air source, can be actuated and the movement brought about is suitable for severing a seal on the connection of a sealant container or a seal on the sealant connection. Before the actuating element is released, the switchover element is in the predefined starting position as described above.

An advantage of the above-described aspect of the present invention is that, as a result of the use of an actuating element as described above, less force has to be applied than when, in such a manipulation, the compressed-air flows need to be interrupted or diverted when switching over from the compressed-air mode to the sealant mode. The latter switchover mechanisms with diversion or interruption of the compressed-air flows are known from example from the applications EP2810767 A1, see FIGS. 2 to 6 and the description of these figures therein, and EP2792473 A1, see FIGS. 2 to 6 and the description of these figures therein. The above-described aspect of the present invention therefore has a technical advantage compared with the two above-described documents, also because, in a device according to the invention, a plurality of parts do not need to be connected together in a complicated manner. This makes it easier for the user to use a puncture assistance system since switching over is easier and less susceptible to error.

In the context of the present invention, an above-described actuating element could be for example a plug to be pulled out as in a grenade. The user would also intuitively determine how to operate this plug from such a plug on account of the similarity with a grenade trigger.

Particular preference is also given to a device according to the invention as described as particularly preferred above, wherein the above-described actuating element is preferably configured such that the releasing of the hold of the holding unit is actuated by rotating a sealant container in or into the sealant connection of a device according to the invention as described above or as described as preferred above or by rotating the sealant connection of a device according to the invention as described above or as described as preferred above. During said rotation, the sealant bottle is preferably rotated from a horizontal position into a vertical position such that the sealant container is arranged upside down after the rotation.

An advantage of the above-described aspect of the present invention is that, as a result of the sealant container being arranged in the "upside down" position, the transfer of the sealant from the sealant container through the sealant transport channel of a device according to the invention can be ensured even more reliably.

In the context of the present invention, the term "upside down" means in particular that the sealant container is arranged such that the connection, comprised by the sealant container, for connecting to the sealant connection of a device according to the invention points downward and the weight of the sealant in the sealant container preferably presses, on account of its weight force, on the connection or on a seal and thus, with a broken seal, the sealant flows out of the sealant container on account of its weight force. In this case, the sealant connection of a device according to the invention should always be arranged such that the connection, to be connected to the sealant connection, of the sealant container is always arranged below the rest of the sealant container after being connected to the sealant connection.

Preference is given to a device according to the invention as described above or as described as preferred above, wherein the device has a stopping unit for stopping the movement of the switchover element, wherein the stopping unit is preferably fitted in the device such that the switchover element is only stopped after at least one seal has been severed and after compressed air has been conducted through the internal channel of the switchover element to the sealant connection.

An advantage of the above-described aspect of the present invention is that the stopping unit prevents the movable switchover element from partially or entirely blocking the sealant connection of the device according to the invention and thus slowing or preventing the transfer of the sealant from the sealant container into the tire.

Preference is given to a device according to the invention as described above or as described as preferred above, wherein the compressed-air transport channel is cylindrical and has an inside diameter and an outside diameter, and/or wherein the device has a spring element for accelerating the movable switchover element in the direction of the sealant connection, wherein the spring element is configured such that, after the releasing of the actuating element or after a suitable manipulation of the switchover element, the spring element brings about an acceleration of the movable switchover element in the direction of the sealant connection.

An advantage of the above-described aspect of the present invention is that, even in the case of smaller compressed-air flows, which do not bring about sufficient force for severing the seal by means of the severing portion of the switchover element, a movement of the switchover element that is sufficient for severing the seal can be ensured compared with a device according to the invention without a spring element. Such reduced compressed-air flows occur in particular in the event of incorrect operation of a puncture assistance system. Therefore, the above-described spring element also has the advantage that it is easier for the user to operate the puncture assistance system.

An example of such a spring element as described above is for example a spring with a smaller outside diameter than the inside diameter of the compressed-air transport channel, such that the spring can be fitted beneath the movable switchover element in the compressed-air transport channel and, after the releasing of the holding unit, supports a movement of the movable switchover element in the direction of the sealant connection. Alternatively, it is of course also possible for an above-described spring element to bring about a movement of the movable switchover element in the direction of the sealant connection even without the aid of the compressed air from the compressed-air source, wherein said movement by means of the spring element is sufficient for severing a seal by means of the severing portion of the switchover element.

A particularly high degree of preference is given to a device according to the invention as described above, comprising at least one device for transporting compressed air and/or sealant into a pneumatic vehicle tire, connecting means for connecting the tire-side end of the sealant transport channel to a tire with a puncture, at least one compressed-air source, wherein the compressed-air source is a compressor and at least one reciprocating-piston compressor having a cylinder and having a reciprocating piston, and at least one motor for moving the reciprocating piston in the cylinder of the reciprocating-piston compressor, and at least one sealant container with sealant, wherein the device is connected to the compressed-air source via the gas connection, to the sealant container via the sealant connection and to the connecting means so as to be ready for use, and the device, the compressed-air source and the sealant container are arranged in a single housing, wherein the housing is configured such that, in operation, it can be set up such that the sealant container is arranged upside down in the system, the device comprises:

at least one gas connection for connecting to at least one compressed-air source, at least one sealant connection for connecting to at least one sealant container, at least two channels, wherein a first channel is a sealant transport channel for transporting a sealant dispersion from the sealant connection into a pneumatic vehicle tire and a second channel is a compressed-air transport channel for transporting compressed air to the sealant connection or to the sealant transport channel, wherein the sealant dispersion comprises sealant particles and compressed air as dispersion matrix, wherein the device has a movable switchover element, wherein the movable switchover element can be moved in the direction of the sealant connection by means of a compressed-air flow coming from the gas connection and has a severing portion for severing a seal, the severing portion of the switchover element is designed, on account of the movement of the movable switchover element in the direction of the sealant connection, to sever a seal on the sealant connection or a seal on a sealant container fastened to the sealant connection, the movable switchover element is arranged in the compressed-air transport channel and/or has one, two, three, four, five or more than five air-flow baffle elements, wherein the one air-flow baffle element or each air-flow baffle element is suitable for at least partially deflecting the flow direction, extending substantially parallel to the direction of movement of the switchover element, of compressed air in the compressed-air transport channel such that, in the compressed-air transport channel, the movable switchover element is moved by means of compressed air coming from a compressed-air source in the direction of the sealant connection, the device has a manually manipulable holding unit for holding the movable switchover element in a predefined starting position, wherein the holding unit can be manipulated such that the movable switchover element can be released from the holding unit and after it has been released, a movement of the movable switchover element, brought about by means of compressed air from a compressed-air source, can be actuated, wherein the predefined starting position of the movable switchover element is within the compressed-air transport channel and/or at the distributor-side end of the compressed-air transport channel, the device has an actuating element for manually releasing the hold of the holding unit of a movement of the movable switchover element from the starting position to the sealant connection, wherein, after the releasing, said movement of the movable switchover element, brought about by means of compressed air from a compressed-air source, can be actuated, wherein said movement brought about is suitable for severing a seal on the connection of a sealant container or a seal on the sealant connection, the movable switchover element is at least substantially in the form of a hollow cylinder and has an internal channel, wherein the switchover element forms, along the vertical extent of the hollow cylinder, in cooperation with the inner wall of the compressed-air transport channel, the following three portions separated by means of flow baffle elements and/or sealing elements:

a bypass portion for conducting compressed air from the compressed-air transport channel directly into the sealant transport channel, and an activation portion, wherein the activation portion is designed to use compressed air coming from the gas connection to move the switchover element in the direction of the sealant connection, and a further portion, which is formed such that compressed air coming from the gas connection is conducted through the internal channel of the switchover element in the form of a hollow cylinder and subsequently in the direction of the sealant connection or into a sealant container, a first sealing element, in cooperation with the internal wall of the compressed-air transport channel, is designed such that no compressed air passes from the bypass portion into the activation portion of the switchover element,
and
the first sealing element, in cooperation with the internal wall of the compressed-air transport channel, is designed such that, after the releasing of the holding element, compressed air is conducted from the activation portion or from said further portion only through the internal channel of the switchover element to the sealant connection,
the device has a stopping unit for stopping the movement of the switchover element, wherein the stopping unit is fitted in the device such that the switchover element is only stopped after at least one seal has been severed and after compressed air has been conducted through the internal channel of the switchover element to the sealant connection,
and
the compressed-air transport channel is cylindrical and has an inside diameter and an outside diameter and wherein the device has a spring element for accelerating the movable switchover element in the direction of the sealant connection, wherein the spring element is configured such that, after the releasing of the holding element, the spring element brings about an acceleration of the movable switchover element in the direction of the sealant connection.

The above-described advantageous aspects of a device according to the invention for transporting compressed air and/or sealant into a pneumatic vehicle tire also apply to all the aspects of a portable/transportable system, described below, for sealing and inflating pneumatic vehicle tires and the advantageous aspects, discussed below, of portable/transportable systems according to the invention apply, mutatis mutandis, to all the aspects of a device according to the invention for transporting compressed air and/or sealant into a pneumatic vehicle tire.

The invention also relates to a portable/transportable system for sealing and inflating pneumatic vehicle tires, comprising
at least one device as claimed in one of the preceding claims,
connecting means for connecting the tire-side end of the sealant transport channel to a tire with a puncture,
at least one compressed-air source, wherein the compressed-air source is preferably a compressor and preferably has
at least one reciprocating-piston compressor having a cylinder and having a reciprocating piston, and
at least one motor for moving the reciprocating piston in the cylinder of the reciprocating-piston compressor,
and optionally
at least one sealant container with sealant and/or at least one manometer for measuring the tire internal pressure of a tire connected to the connecting means.

In the context of the present invention, the expressions "portable/transportable system for sealing and inflating pneumatic vehicle tires" and "puncture assistance system" are used synonymously.

Preference is given to a system as described above, wherein the sealant container has an aspect ratio of the width to the height of the sealant container in the range from 1:1 to 20:1, preferably in the range from 2:1 to 20:1, preferably in the range from 5:1 to 10:1, preferably in the range from 1.4:1 to 3:1, wherein the height extends along the central axis of the connection, provided for connecting to a sealant connection of a device according to the invention, of the sealant container as far as the sealant container wall opposite the connection, and the width of the sealant container extends perpendicularly to said height.

Preference is given to a system according to the invention as described above or as described as preferred above, wherein the device is connected to the compressed-air source via the gas connection, to the connection of the sealant container via the sealant connection and to the connecting means so as to be ready for use, and/or the device, the compressed-air source and optionally the sealant container are arranged in a single housing, wherein the housing is configured such that, in operation, it can be set up such that the sealant container in the housing is arranged upside down in the system.

An advantage of the above-described aspect of the present invention is that substantially complete emptying of the sealant container is achieved. This can take place for example by displacing the container from a horizontal position into a vertical position (see FIGS. 7 and 8) or be achieved in that the sealant connection is fitted on a device according to the invention such that the connection, to be connected to the sealant connection, of the sealant container is always arranged below the rest of the sealant container.

Preference is given to a system according to the invention as described above or as described as preferred above, wherein the severing portion of the switchover element is intended, on account of a movement of the movable switchover element in the direction of the sealant connection, to sever a seal on the sealant container fastened to the sealant connection, wherein the seal on the sealant container fastened to the sealant connection is designed to be severed in the event of a movement, actuated by means of compressed air coming from a compressed-air source, of the movable switchover element in the direction of the sealant connection.

The above-described advantageous aspects of portable/transportable systems according to the invention and of a device according to the invention for transporting compressed air and/or sealant into a pneumatic vehicle tire also apply to all the aspects of methods described below and the advantageous aspects, discussed below, of methods according to the invention apply, mutatis mutandis, to all the aspects of a portable/transportable system according to the invention and of a device according to the invention for transporting compressed air and/or sealant into a pneumatic vehicle tire.

The invention also relates to a method for sealing and/or inflating pneumatic vehicle tires, comprising the following steps:
A) providing a system as described above or as described as preferred above having a sealant container with sealant and a pneumatic vehicle tire with a puncture, wherein the puncture is preferably suitable for being sealed by means of a system as described above or as described as preferred above,
B) connecting the sealant transport channel of the system to the pneumatic vehicle tire with the puncture by means of the connecting means of the system,
C) moving the movable switchover element in the direction of the sealant connection by means of compressed air from the compressed-air source, wherein the movement is actuated preferably by releasing the hold of the holding unit,
D) using a system described above or described as preferred above to pump compressed air coming from the compressed-air source into a device as described above or as described as preferred above or as described as particularly preferred above, E) severing a seal on the sealant connection and/or on the sealant container such that sealant can pass out of the sealant container into the sealant transport channel, F) feeding sealant from the sealant container into the pneumatic vehicle tire by means of the compressed air from the compressed-air source, such that the puncture in the pneumatic vehicle tire is at least partially sealed by means of the sealant delivered into the pneumatic vehicle tire, G) optionally increasing the tire internal pressure of the pneumatic vehicle tire having the puncture to a minimum pressure, preferably to at least 1 bar, wherein compressed air and sealant are pumped into the pneumatic vehicle tire from the system described above or described as preferred above.

Preference is given to a method according to the invention as described above or as described as preferred above, wherein the movable switchover element is at least substantially in the form of a hollow cylinder and has an internal channel and a severing portion for severing a seal, wherein the switchover element forms, along the vertical extent of the hollow cylinder, in cooperation with the inner wall of the compressed-air transport channel, at least one portion, wherein the at least one portion comprises at least one bypass portion for conducting compressed air from the compressed-air transport channel into the sealant transport channel, wherein in step C), the tire internal pressure of the pneumatic vehicle tire having the puncture is increased such that compressed air is conducted from the compressed-air transport channel through the bypass portion, and the severing in step E) takes place by means of the severing portion of the movable switchover element.

The advantages of the above-described aspect of the present invention are explained above in relation to the device according to the invention or to the system according to the invention.

Preference is given to a method according to the invention as described above or as described as preferred above, wherein the switchover element forms, along the vertical extent of the hollow cylinder, in cooperation with the inner wall of the compressed-air transport channel, at least one further portion, and in step F), compressed air coming from the gas connection is conducted through the internal channel of the switchover element in the form of a hollow cylinder and subsequently into the sealant container and is delivered into the pneumatic vehicle tire together with sealant from the sealant container.

The advantages of the above-described aspect of the present invention are explained above in relation to the device according to the invention or to the system according to the invention.

The invention also relates to a method for inflating pneumatic vehicle tires, comprising the following steps:

A) providing a system described above or described as preferred above and a pneumatic vehicle tire, B) connecting the sealant transport channel of the system to the pneumatic vehicle tire, C) using a system described above or described as preferred above to increase the tire internal pressure of the pneumatic vehicle tire to a minimum pressure, preferably to the tire internal pressure specified by the tire manufacturer, wherein compressed air is pumped into the pneumatic vehicle tire from the compressed-air source of the system described above or described as preferred above by a device as described above or as described as preferred above or as described as particularly preferred above.

The advantages of the above-described aspect of the present invention are explained above in relation to the device according to the invention or to the system according to the invention.

The above-described advantageous aspects of portable/transportable systems according to the invention and of a device according to the invention for transporting compressed air and/or sealant into a pneumatic vehicle tire and of one of the methods according to the invention also apply to all the aspects of uses described below and the advantageous aspects, discussed below, of uses according to the invention apply, mutatis mutandis, to all the aspects of portable/transportable systems according to the invention and of a device according to the invention for transporting compressed air and/or sealant into a pneumatic vehicle tire and of one of the methods according to the invention.

The invention also relates to the use of a system described above or described as preferred above for inflating pneumatic vehicle tires and/or for sealing pneumatic vehicle tires.

The invention also relates to the use of an actuating element for use in a device as described above or as described as preferred above or as described as particularly preferred above for actuating a movement of a movable switchover element of the device by means of compressed air coming from a compressed-air source, wherein the severing portion of the movable switchover element preferably severs a seal on the sealant connection and/or a seal on a sealant container.

DESCRIPTION OF THE FIGURES

In the figures:

FIG. 1 shows a schematic illustration of a part of a cross section of a system 38 according to the invention comprising a device 1 according to the invention having a movable switchover element 7 comprising a severing portion 8 for severing a seal 11, wherein the movable switchover element 7 is in a predefined starting position in the compressed-air transport channel 5 of the device 1 according to the invention. The device 1 shown in FIG. 1 comprises a gas connection 3 for connecting to a compressed-air source, a sealant connection 2 for connecting to a sealant container 6, two channels 5, 4, wherein a first channel is a sealant transport channel 4 for transporting a sealant dispersion from the sealant connection 2 into a pneumatic vehicle tire and a second channel is a compressed-air transport channel 5 for transporting compressed air to the sealant connection 2 or to the sealant transport channel 4, wherein the device 1 has a movable switchover element 7, wherein the movable switchover element 7 can be moved by means of a compressed-air flow flowing in the direction of flow 28 from the gas connection 3 and has a severing portion 8 for severing a seal 11. The movable switchover element 7 is in the form of a hollow cylinder and therefore also has an internal channel 14, wherein the switchover element 7 forms, along the vertical extent 15, in cooperation with the inner wall 16 of the compressed-air transport channel 6, a plurality of portions, wherein the plurality of portions comprise the following portions: a bypass portion 18 for conducting compressed air from the compressed-air transport channel 5 directly into the sealant transport channel 4 and an activation portion 19, wherein the activation portion 19 is designed to use compressed air coming from the gas connection 3 to move the switchover element 7 in the direction of the sealant connection 2, and a further portion 20, wherein the further portion 20 is formed such that compressed air coming from the gas connection 3 can be conducted in the direction of movement 10 to the sealant connection 2 or into a sealant container 6 through the internal channel 14 of the switchover element 7. The different portions 8, 18, 19 are separated from one another in the embodiment shown in FIG. 1 by means of O-rings 34 comprising air-flow baffle elements 9. FIG. 1 shows that the switchover element 7 is arranged on the distributor-side end 12 of the compressed-air transport channel 5. The embodiment, shown in FIG. 1, of a device 1 according to the invention is in the above-described compressed-air mode, since compressed air from the gas connection 3 directly to the tire-side end 13 of the sealant transport channel 4 by the compressed air being conducted around the switchover element 7 from the gas connection 3 through the intermediate space between the inner wall 16 and the outer wall 21 of the switchover element 7 and being conducted, at the distributor-side end of the sealant transport channel 4, in the direction of flow 28 into the sealant transport channel 4 and onward to the tire-side end 13. As shown in FIG. 1, in the compressed-air mode, the sealant 32 is still located behind the closed seal 11 in the sealant container 6 connected by means of the connection 33. For clarity reasons, neither the connecting means for connecting the tire-side end of the sealant transport channel to a tire having a puncture nor the compressed-air source are shown in FIG. 1, but a part of the one-piece housing 31 is shown.

Figure 1:
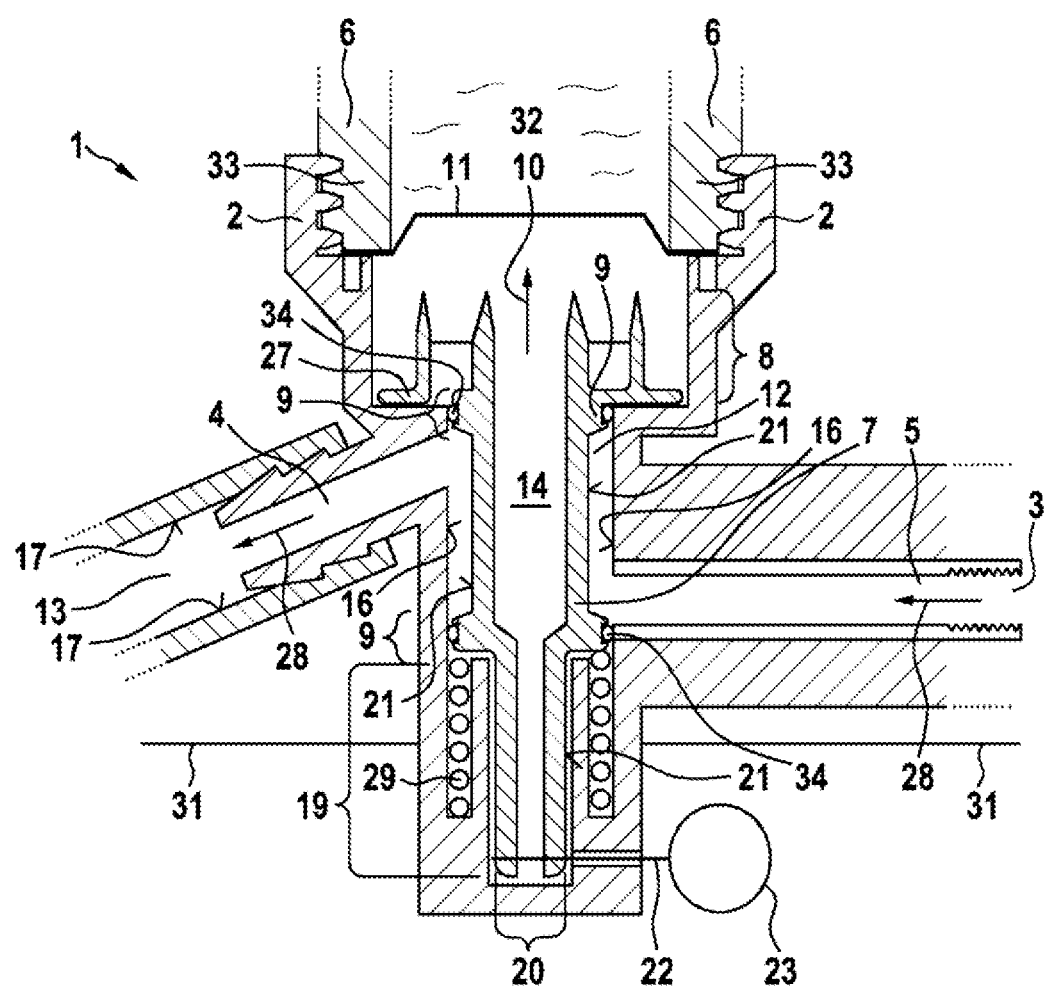
FIG. 1: shows a cross section of a schematically illustrated device according to the invention having a movable switchover element for severing a seal in the compressed-air transport channel of the device according to the invention, wherein compressed air is conducted into the sealant transport channel through the bypass portion of the movable switchover element.

It is apparent from FIG. 1 that the air-flow baffle elements 9 seal off the bypass portion 18 of the switchover element 7 such that the compressed air is conducted directly into the sealant transport channel 4 from the gas connection 3. At the same time, the movable switchover element 7 is held in position by means of a manually manipulable holding unit 22, which is illustrated in FIG. 1 by way of example by what is known as a securing pin. The eye 23 of the securing pin serves as an example of an actuating element 23 for manually releasing the hold of the holding unit 22. Since the pin part 22 of the securing pin holds the movable switchover element 7 in the predefined starting position as shown in FIG. 1, the spring 29 remains tensioned and cannot accelerate the movable switchover element in the direction of movement 10.

Furthermore, stopping units 27 on the movable switchover element 7 are illustrated in FIG. 1, said stopping units 27 stopping the movement of the switchover element 7 in the direction of movement 10 when the movable actuating element 27 is in the predefined end position (see FIG. 3) following the movement.

Figure 2:
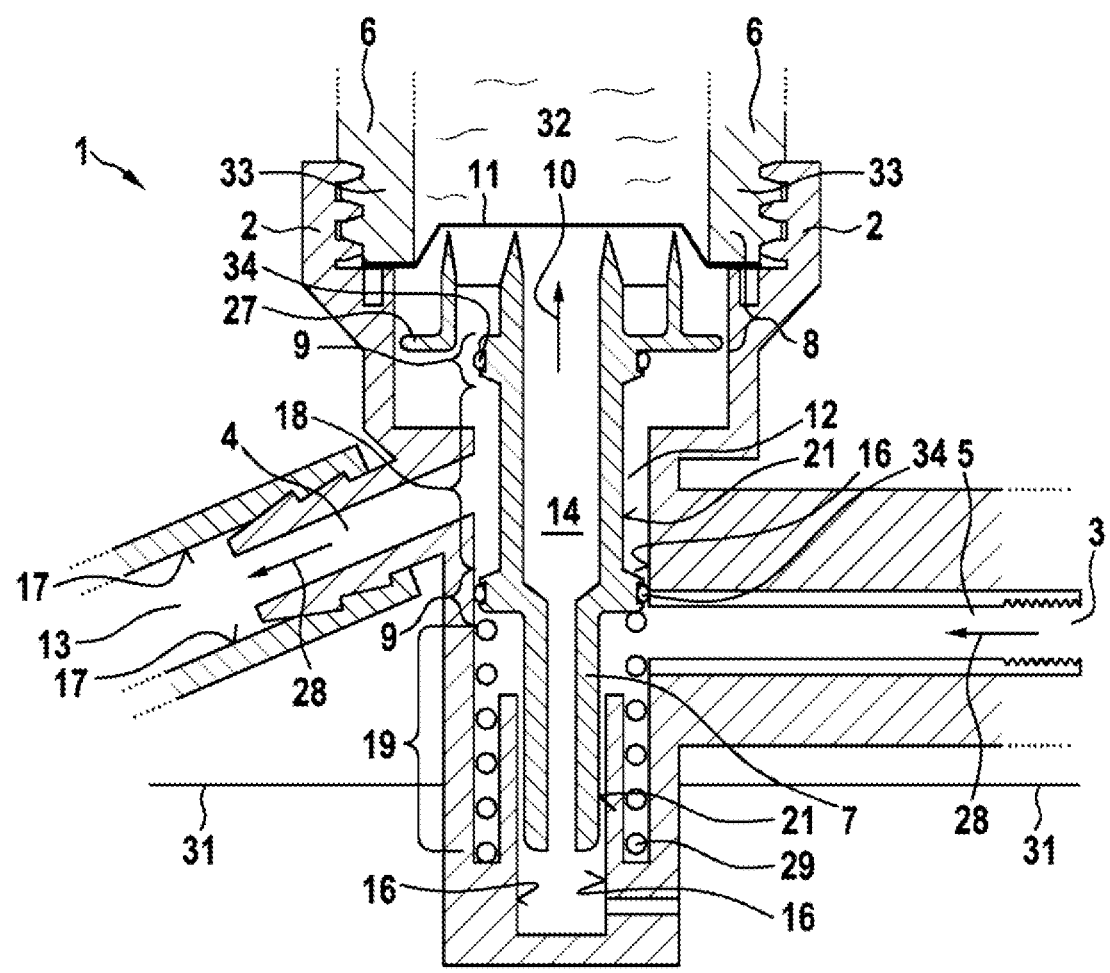
FIG. 2: shows a cross section of a schematically illustrated device according to the invention having a movable switchover element for severing a seal in the compressed-air transport channel of the device according to the invention, wherein, after the removal of the actuating element and following acceleration by the spring, compressed air is conducted into the activation portion of the movable switchover element.

FIG. 2 shows the same embodiment of a device 1 according to the invention in a system 38 according to the invention as in FIG. 1. However, in the embodiment illustrated in FIG. 2, the securing pin has already been released, with the result that the device 1 according to the invention as illustrated in FIG. 2 is already in the activation mode. In the embodiment illustrated in FIG. 2, the movable switchover element 7 has already been moved sufficiently in the direction of movement 10 since the compressed-air flow coming from the gas connection 3 is no longer conducted into the bypass portion 18 but into the activation portion 19 and thus, on account of the lower air-flow baffle element 9, the movable switchover element 7 is now accelerated in the direction of movement 10 of the sealant connection 2 only by means of the compressed-air flow coming from the gas connection 3. After the seal 11 has been severed, the stopping units 27 will stop the movement of the movable switchover element 7 in the direction of movement 10, whereupon the activation mode of a device 1 according to the invention ends and the device 1 according to the invention passes into the sealant mode (see FIG. 3), in which the sealant 32, together with compressed air, is conducted from the sealant container 6 in the direction of flow 28 toward the tire-side end 13 of the sealant transport channel 4.

Figure 3:
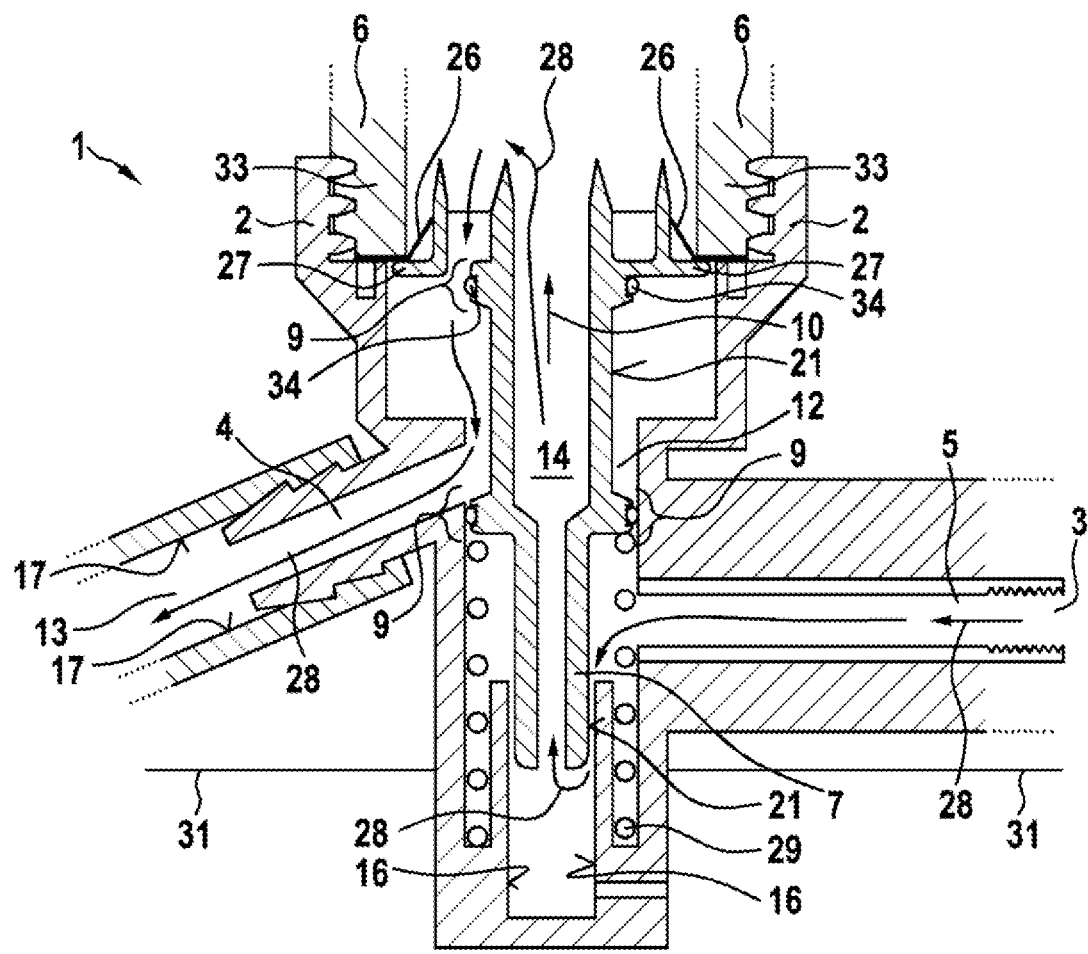
FIG. 3: shows a cross section of a schematically illustrated device according to the invention having a movable switchover element for severing a seal in the compressed-air transport channel of the device according to the invention, wherein compressed air is conducted into the sealant container having sealant through the internal channel of the switchover element.

FIG. 3 shows the same embodiment of a device 1 according to the invention in a system 38 according to the invention as in FIG. 2 and in FIG. 1. However, in the embodiment illustrated in FIG. 3, the seal 26 has already been destroyed and the movement of the movable switchover element 7 in the direction of movement 10 has been stopped by means of the stopping units 27, with the result that the device 1 according to the invention, as illustrated in FIG. 3, is already in the sealant mode. In the sealant mode, compressed air is conducted into the internal channel 14 from the gas connection 3 in the direction of flow 28 around the portion 20 of the movable switchover element 7, and subsequently into the sealant container 6. Once it has arrived there, the compressed air mixes with sealant 32. The mixture of compressed air and sealant 32 is then pushed into the sealant transport channel 4 in the direction of flow 28 through the severing portion 8 of the switchover element 7 and can be conducted from there, in the direction of flow 28, into the tire having the puncture, which is not illustrated in FIG. 3. It is also apparent from FIG. 3 that the lower O-ring 34 has been fitted on the lower air-flow baffle element 9 such that the compressed air is prevented from being conducted onward from the gas connection 3 directly into the sealant transport channel.

Figure 4:
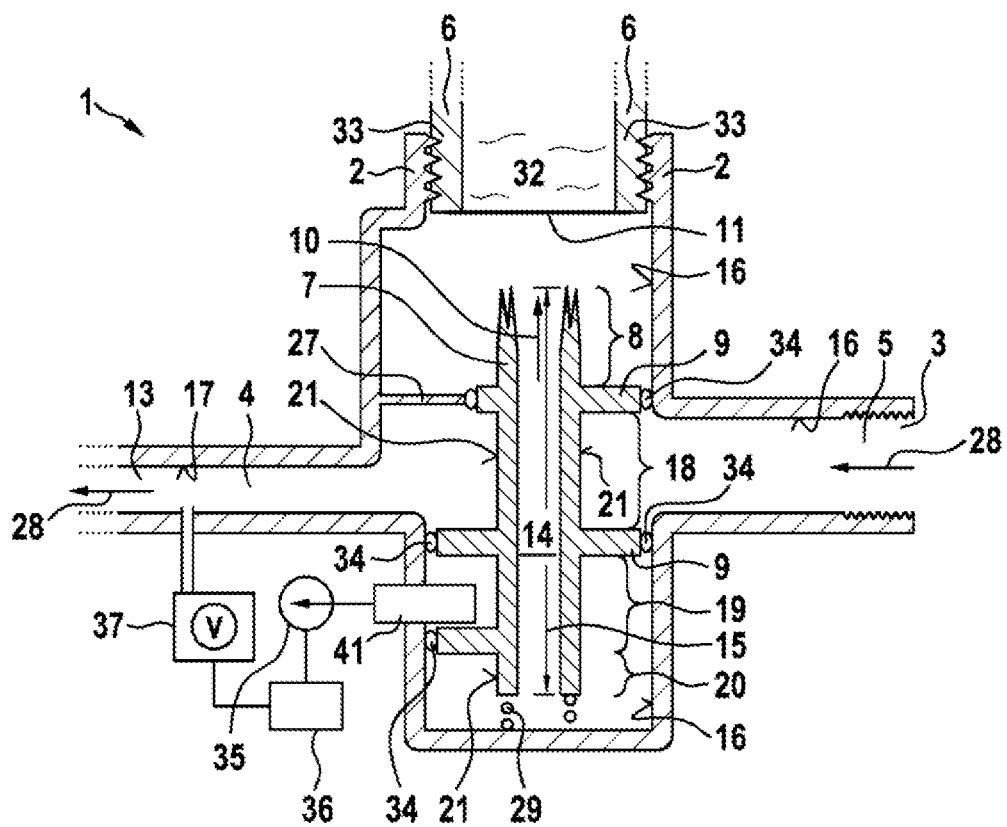
FIG. 4: shows a schematic illustration of a cross section of a device according to the invention having a movable switchover element comprising a severing portion for severing a seal fitted on the connection of a sealant container.

FIG. 4 shows a schematic illustration of a cross section of a device 1 according to the invention having a movable switchover element 7 comprising a severing portion 8 for severing a seal 11 fitted on the connection 33 of a sealant container 6, wherein the movable switchover element is in a predefined starting position in the compressed-air transport channel 5 of the device 1 according to the invention. The device 1 shown in FIG. 4 comprises a gas connection 3 for connecting to a compressed-air source, a sealant connection 2 for connecting to a sealant container 6, two channels 5, 4, wherein a first channel is a sealant transport channel 4 for transporting a sealant dispersion from the sealant connection 2 into a pneumatic vehicle tire and a second channel is a compressed-air transport channel 5 for transporting compressed air to the sealant connection 2 or to the sealant transport channel 4, wherein the device 1 has a movable switchover element 7, wherein the movable switchover element 7 can be moved by means of a compressed-air flow flowing in the direction of flow 28 from the gas connection 3 and has a severing portion 8 for severing a seal 11. The movable switchover element is in the form of a hollow cylinder and therefore also has an internal channel 14, wherein the switchover element 7 forms, along the vertical extent 15, in cooperation with the inner wall 16 of the compressed-air transport channel 6, a plurality of portions, wherein the plurality of portions comprise the following portions: a bypass portion 18 for conducting compressed air from the compressed-air transport channel 5 directly into the sealant transport channel 4 and an activation portion 19, wherein the activation portion 19 is designed to use compressed air coming from the gas connection 3 to move the switchover element 7 in the direction of the sealant connection 2, and a further portion 20, wherein the further portion 20 is formed such that compressed air coming from the gas connection 3 can be conducted in the direction of movement 10 to the sealant connection 2 or into a sealant container 6 through the internal channel 14 of the switchover element 7. The different portions 8, 18, 19 are separated from one another in the embodiment shown in FIG. 4 by means of O-rings 34 comprising air-flow baffle elements 9. FIG. 1 shows that the switchover element 7 is arranged on the distributor-side end 12 of the compressed-air transport channel 5. The embodiment, shown in FIG. 4, of a device 1 according to the invention is in the above-described compressed-air mode, since compressed air is conducted directly to the tire-side end 13 of the sealant transport channel 4 from the gas connection 3. This takes place by the compressed air being conducted around the switchover element 7 from the gas connection 3 through the intermediate space between the inner wall 16 and the outer wall 21 of the switchover element 7 and being conducted, at the distributor-side end of the sealant transport channel 4, in the direction of flow 28 into the sealant transport channel 4 and onward to the tire-side end 13. As shown in FIG. 1, in the compressed-air mode, the sealant 32 is still located behind the closed seal 11 in the sealant container 6 connected by means of the connection 33. For clarity reasons, neither the connecting means for connecting the tire-side end of the sealant transport channel to a tire having a puncture nor the compressed-air source are shown in FIG. 4, and nor is a one-piece housing of a system according to the invention.

It is apparent from FIG. 4 that the air-flow baffle elements 9 seal off the bypass portion 18 of the switchover element 7 such that the compressed air is conducted directly into the sealant transport channel 4 from the gas connection 3. In this case, the movable switchover element 7 is held in position by means of an electronically manipulable holding unit 35, which can be manipulated in FIG. 4 by an open-loop and closed-loop control unit 36 by means of an electronically actuable actuating element 41 such that the holding unit 35 no longer holds the movable switchover element 7 in the predefined starting position in order that the spring 29 can accelerate the movable switchover element 7 in the direction of movement 10. The open-loop and closed-loop control unit 36 can in this case receive pressure measurement signals from a manometer 37, which, as shown in FIG. 4, can measure the pressure in the sealant transport channel. However, it is also conceivable for the manometer 37 to measure the tire internal pressure in a tire with a puncture fitted at the tire-side end 13 of the sealant transport channel 4. Furthermore, stopping units 27 in the device 1 according to the invention are illustrated in FIG. 1, said stopping units 27 stopping the movement of the switchover element 7 in the direction of movement 10 when the movable switchover element 7 is in a predefined end position.

Figure 5:
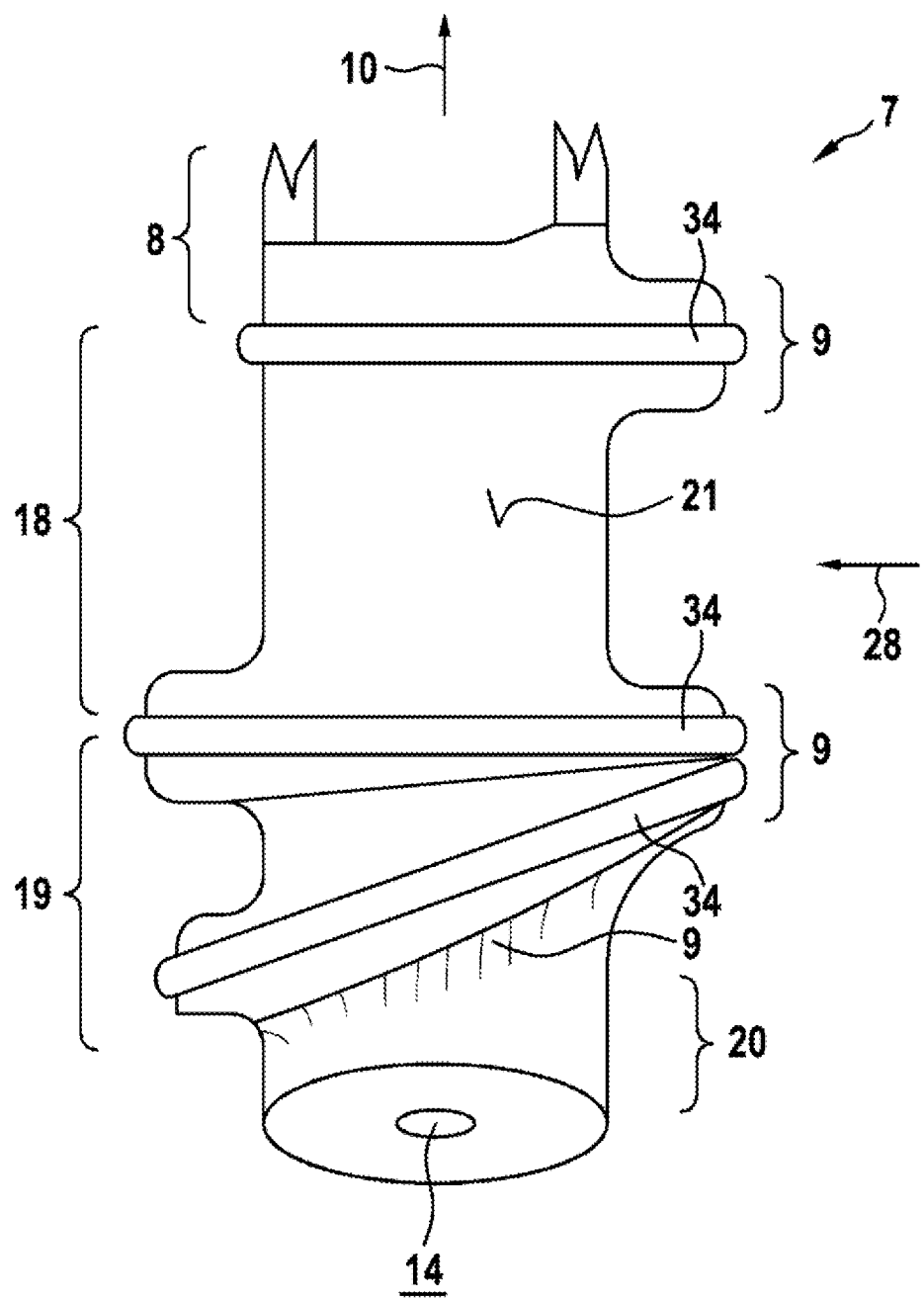
FIG. 5: shows a movable switchover element of a device according to the invention as can be seen in FIG. 4, but in a perspective worm's eye view.

FIG. 5 shows the same embodiment of a movable switchover element 7 of a device 1 according to the invention as in FIG. 4, but the movable switchover element 7 of a device 1 according to the invention is illustrated in a perspective worm's eye view in FIG. 5. The switchover element 7 comprises a severing portion 8, a bypass portion 18, an activation portion 19 and a further portion 20, and an internal channel 14. As shown in FIG. 5, the severing portion 8 comprises spikes and/or sharp edges for severing a seal (not illustrated) as described above. The individual portions 8, 18, 19, 20 are separated from one another by means of elevations deviating from the ideal form of a hollow cylinder, wherein respective O-rings 34 rest on these elevations, as shown in FIG. 5, and these elevations are configured such that a compressed-air flow coming from the direction of flow 28 and striking the outer wall 21 would accelerate the movable switchover element 7 in the direction of movement 10. These elevations and in particular their specifically rounded form likewise represent specific air-flow baffle elements 9 in the context of the present invention.

Figure 6:
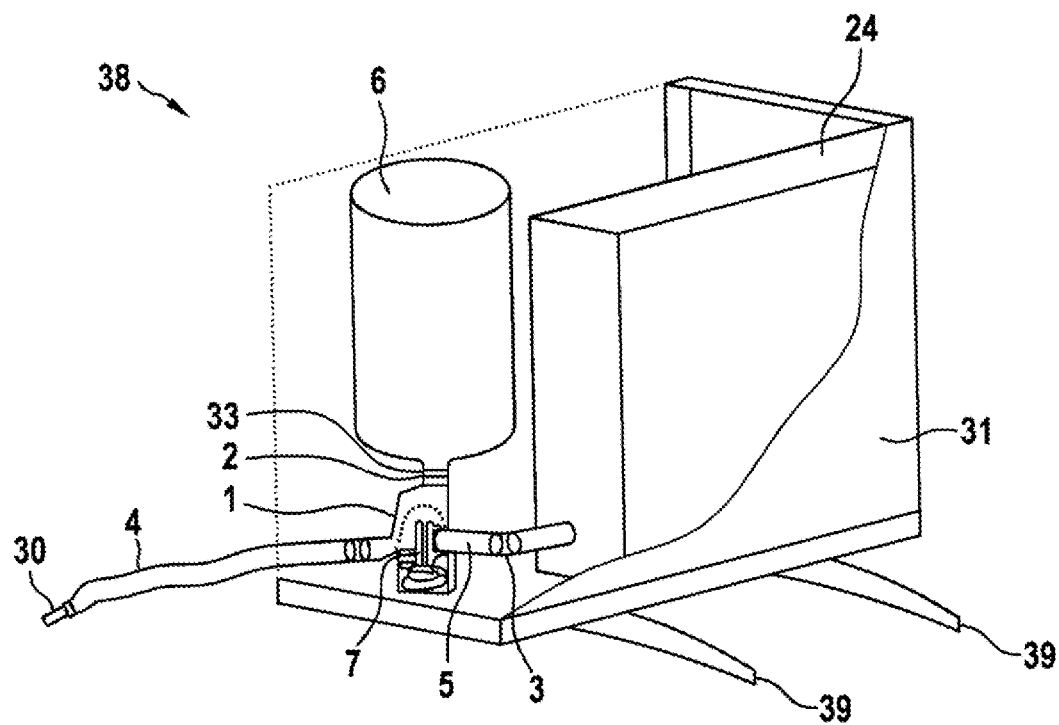
FIG. 6: shows a perspective illustration of a system according to the invention for sealing and inflating pneumatic vehicle tires, wherein a part of the one-piece housing is illustrated only in a manner indicated by means of dotted lines, in order to better identify the individual components of the system.

FIG. 6 schematically shows a perspective illustration of a system 38 according to the invention for sealing and inflating pneumatic vehicle tires, wherein a part of the one-piece housing 31 is illustrated transparently in a manner indicated by means of dotted lines, in order to better identify the individual components of the system 38. The system 38 comprises a device 1, connecting means 30 for connecting the tire-side end of the sealant transport channel to a tire having a puncture, a compressed-air source 24 and a sealant container 6 with sealant and the device 1 is connected to the compressed-air source 24 by means of the gas connection 3, to the connection 33 of the sealant container 6 by means of the sealant connection 2, and to said connecting means 30 by means of the sealant transport channel 4 so as to be ready for use. In addition, a part of the device 1 is also illustrated transparently in a manner indicated by means of dotted lines in FIG. 6, such that the movable switchover element 7 within the device 1 can be identified. The system 38 allows the inflation of pneumatic vehicle tires in that compressed air can be conducted from the compressor 24 into the compressed-air transport channel 5 and subsequently into a pneumatic vehicle tire via the sealant transport channel 4 and via the connecting means 30. In addition, depending on embodiments, as described above, the switchover element 7 can destroy a seal on the sealant container 6 and thus actuate the sealant mode in that the compressed air is not conducted directly into the sealant transport channel 4 but is conducted into the sealant container beforehand. Subsequently, in the sealant mode, the mixture of sealant and compressed air, wherein the mixture is frequently in the form of a dispersion with the compressed air as continuous phase, can be pushed into a pneumatic vehicle tire via the sealant transport channel 4 and the connecting means 30. Once it has arrived in the vehicle tire, the mixture or dispersion made up of sealant and compressed air can then seal the leak in the pneumatic vehicle tire. The system 38 according to the invention shown in FIG. 6 was brought into an upright position by means of the mountable feet 39 such that the sealant container 6 located within the one-piece housing 31 is positioned upside down in the system 38 according to the invention. The mountable feet 39 are an example of uprighting means 39 as can be used in order to bring the system 38 according to the invention into a desired position. The mountable feet 39 are preferably not attached to a system 38 according to the invention from the outset, in order that the system 38 according to the invention can be accommodated as compactly as possible in a vehicle. This is particularly readily possible with the system 38 according to the invention illustrated in FIG. 6 since it shows a particularly compact design of a tire repair kit.

Figure 7:
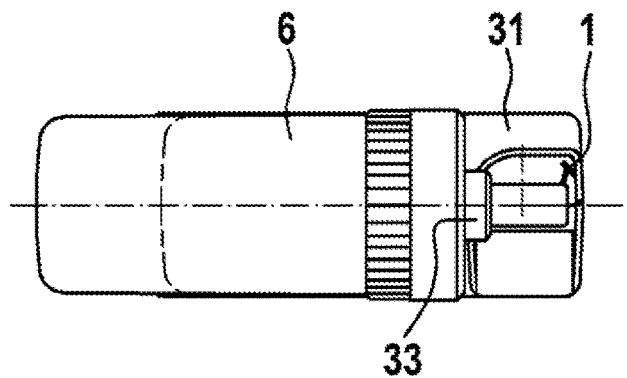
FIGS. 7 & 8: show a side view of a further embodiment of a system according to the invention in a single housing, wherein the sealant container is located outside the housing for easy replacement.
Figure 8:
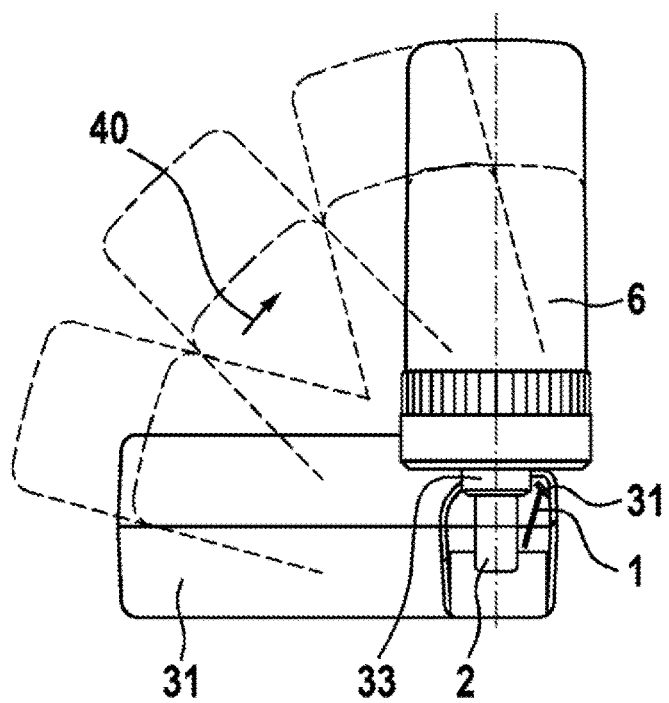

FIGS. 7 and 8 show a further embodiment of a system 38 according to the invention in a single housing 31 in a side view, wherein the sealant container 6 can be seen and the sealant container 6 partially conceals the rest of the housing 31 in the side view as illustrated in FIG. 7.

The device 1 according to the invention as shown in FIG. 7 is connected to the sealant container 6 via the sealant connection 33 and to the compressor (not shown in FIG. 7) via the gas connection (not shown in FIG. 7). The system 38 according to the invention shown in FIG. 7 rests flat on an underlying surface, wherein, in this position, it is in the compressed-air mode and can transport compressed air directly from the compressed-air transport channel into the sealant transport channel and onward to a pneumatic vehicle tire.

As shown in FIG. 8, the sealant container 6 can be rotated in the direction of rotational movement 40 together with the sealant connection 2 of the device 1 according to the invention, with the result that the sealant container 6 comes to rest upside down, meaning that the connection 33 is located beneath the rest of the sealant container 6. During or after this rotational movement, by means of the above-described mechanisms, the sealant mode is actuated in the device 1 according to the invention. During the rotational movement shown in FIG. 8, it is possible for example for the above-described holding unit to be released in different ways.

LIST OF REFERENCE SIGNS

1 Receiving unit; distributor device; device according to the invention for transporting compressed air and/or sealant into a pneumatic vehicle tire
2 Sealant connection for connecting to at least one sealant container
3 Gas connection for connecting to at least one compressed-air source
4 Sealant transport channel for connecting to at least one compressed-air source
5 Compressed-air transport channel for connecting to at least one sealant container
6 Sealant container
7 Movable switchover element which can be moved by means of a compressed-air flow coming from the gas connection
8 A severing portion, suitable for severing a seal, of the movable switchover element
9 Air-flow baffle elements
10 Direction of movement of the switchover element
11 Seal to be severed by means of the severing portion of the movable switchover element
12 Distributor-side end of the compressed-air transport channel
13 Tire-side end of the sealant transport channel
14 Internal channel of the movable switchover element
15 Vertical extent of the movable switchover element
16 Inner wall of the compressed-air transport channel
17 Inner wall of the sealant transport channel
18 First portion of the movable switchover element; bypass portion for conducting compressed air from the compressed-air transport channel directly into the sealant transport channel
19 Second portion of the movable switchover element; activation portion designed to use compressed air coming from the gas connection to move the switchover element in the direction of the sealant connection
20 Third portion of the movable switchover element, designed to conduct compressed air coming from the gas connection through the internal channel of the switchover element in the form of a hollow cylinder
21 Outer wall of the movable switchover element
22 Pin part of the securing pin; manually manipulable holding unit for holding the movable switchover element
23 Eye of the securing pin; actuating element for manually releasing the hold of the holding unit in order to bring about a movement of the movable switchover element from the starting position to the sealant connection
24 Compressed-air source; compressor
25 Connecting portion of the sealant container
26 Destroyed seal of the sealant container
27 Stopping unit for stopping the movement of the switchover element
28 Direction of flow of the compressed air and/or of the sealant
29 Spring; spring element for accelerating the movable switchover element in the direction of the sealant connection
30 Connecting means for connecting the tire-side end of the sealant transport channel to a tire with a puncture
31 One-piece housing for the device according to the invention, the compressed-air source and the sealant container
32 Sealant
33 Connection, provided for connecting to a sealant connection of the device, on the sealant container
34 O-ring
35 Electronically manipulable holding unit for holding the movable switchover element 36 Open-loop and closed-loop control unit for the electronic manipulation of the holding unit of the movable switchover element
37 Pressure measurement unit for measuring the air pressure in a tire or in the sealant transport channel; manometer
38 Portable/transportable system for sealing and inflating pneumatic vehicle tires; puncture assistance system; tire repair kit
39 Mountable foot; uprighting means for setting up the portable/transportable system such that the sealant container in the housing is arranged upside down in the system
40 Rotational movement for rotating the sealant container on the sealant connection
41 Electronically actuable actuating element for releasing the hold of the holding unit 35

The invention claimed is:

1. A device comprising:
at least one gas connection configured to connect to at least one compressed-air source,
at least one sealant connection configured to connect to at least one sealant container,
at least two channels, wherein a first channel is a sealant transport channel configured to transport a sealant dispersion from the at least one sealant connection into a pneumatic vehicle tire and a second channel is a compressed-air transport channel configured to transport compressed air to the at least one sealant connection or to the sealant transport channel;
wherein the device has a movable switchover element, and wherein the movable switchover element is movable by a compressed-air flow coming from the at least one gas connection and has a severing portion configured to sever a seal on the at least one sealant connection or a seal on the at least one sealant container fastened to the at least one sealant connection;
wherein the movable switchover element includes a hollow cylinder having an internal channel, wherein the movable switchover element forms, along a vertical extent of the hollow cylinder in cooperation with an inner wall of the compressed-air transport channel, a plurality of portions, wherein the plurality of portions comprise at least the following portions:
a bypass portion configured to conduct compressed air from the compressed-air transport channel into the sealant transport channel without flowing through the internal channel to the at least one sealant connection, and
an activation portion, wherein the activation portion is designed to use compressed air coming from the at least one gas connection to move the switchover element in the direction of the at least one sealant connection.

2. The device as claimed in claim 1, wherein the movable switchover element has one, two, three, four, five or more than five air-flow baffle(s), wherein the air-flow baffle(s) are suitable for at least partially deflecting a flow direction, extending substantially parallel to a direction of movement of the switchover element, of compressed air in the compressed-air transport channel or to deflect the compressed air such that, in the compressed-air transport channel, the movable switchover element is moved by compressed air coming from the at least one compressed-air source in a direction of the at least one sealant connection.

3. The device as claimed in claim 1,
wherein the switchover element forms, along the vertical extent of the hollow cylinder, in cooperation with the inner wall of the compressed-air transport channel, at least one further portion, wherein the one further portion is formed such that compressed air coming from the at least one gas connection is conducted through the internal channel of the switchover element and subsequently in the direction of the at least one sealant connection or into the at least one sealant container.

4. The device as claimed in claim 1, wherein:
the severing portion of the switchover element is arranged on the movable switchover element and provided, on account of a movement of the movable switchover element in the direction of the at least one sealant connection, so as to sever the seal on the at least one sealant connection or seal on the at least one sealant container fastened to the at least one sealant connection,
and/or
the at least one sealant connection is sealed with the seal, wherein the seal of the at least one sealant connection is designed to be severed in the event of a movement of the movable switchover element, actuated by compressed air coming from the at least one compressed-air source, in the direction of the at least one sealant connection.

5. The device as claimed in claim 1, wherein the device has an electronically or manually manipulable holder for holding the movable switchover element, wherein the holder is designed such that it is manipulated such that the movable switchover element is released from the holder and after it has been released, a movement of the movable switchover element, brought about by compressed air from the at least one compressed-air source, can be actuated, wherein the movement brought about is suitable for severing the seal on the at least one sealant container fastened to the at least one sealant connection or the seal on the at least one sealant connection by the severing portion.

6. The device as claimed in claim 1, wherein the device has an electronically or manually manipulable holder for holding the movable switchover element in a predefined starting position and the holding unit is configured such that the holder holds the movable switchover element in the predefined starting position while the switchover element is flowed around by compressed air from the at least one compressed-air source, wherein the predefined starting position of the movable switchover element is within the compressed-air transport channel and/or at the distributor-side end of the compressed-air transport channel.

7. The device as claimed in claim 1, wherein the device has an electronically or manually manipulable holder for holding the movable switchover element in a predetermined starting position, and wherein the device has an actuator for manually releasing the hold of the holder in order to bring about a movement of the movable switchover element from the starting position to the at least one sealant connection, wherein the actuator, the holder and the movable switchover element are designed such that, after the releasing of the actuator, a movement of the movable switchover element, brought about by compressed air from the at least one compressed-air source, is actuated and the movement brought about is suitable for severing the seal on the the at least one sealant container or the seal on the at least one sealant connection.

8. The device as claimed in claim 1, wherein the device has a stop for stopping the movement of the switchover element, wherein the stop is fitted in the device such that the switchover element is only stopped after the seal has been severed and after compressed air has been conducted through the internal channel of the switchover element to the at least one sealant connection.

9. The device as claimed in claim 1, wherein the compressed-air transport channel is cylindrical and has an inside diameter and an outside diameter, wherein the device has a spring for accelerating the movable switchover element in the direction of the at least one sealant connection, wherein the spring is configured such that, after releasing the movable switchover element, the spring brings about an acceleration of the movable switchover element in the direction of the at least one sealant connection.

10. The device as claimed in claim 1, wherein the device has a spring for accelerating the movable switchover element in the direction of the at least one sealant connection, wherein the spring is configured such that, after releasing the movable switching element, the spring brings about an acceleration of the movable switchover element in the direction of the at least one sealant connection.

11. A portable/transportable system for sealing and inflating pneumatic vehicle tires, comprising:
    at least one device as claimed in claim 1,
    a connector for connecting a tire-side end of the sealant transport channel to a tire with a puncture,
    at least one compressed-air source, wherein the at least one compressed-air source is a compressor, and
    at least one sealant container with sealant contained therein.

12. The portable/transportable system as claimed in claim 11, wherein a connection, provided for connecting to the at least one sealant connection of the device, on the sealant container is sealed with the seal and/or the device is connected to the compressed-air source via the at least one gas connection, to the connection of the sealant container via the at least one sealant connection and to said connector so as to be ready for use.

13. The portable/transportable system as claimed in claim 11, wherein the at least one device, the at least one compressed-air source and the at least one sealant container are arranged in a single housing, wherein the housing is configured such that, in operation, is set up such that the sealant container in the housing is arranged upside down in the system.

14. A method for sealing pneumatic vehicle tires, comprising:
    A) providing the system as claimed in claim 11 and a pneumatic vehicle tire with a puncture;
    B) connecting the sealant transport channel of the system to the pneumatic vehicle tire with the puncture by the connector of the system;
    C) moving the movable switchover element in the direction of the at least one sealant connection by compressed air from the compressed-air source, wherein the movement is actuated by releasing the hold of a holder;
    D) using the system to pump compressed air coming from the compressed-air source into the at least one device of the system;
    E) severing the seal on the at least one sealant connection and/or the seal on the at least one sealant container such that sealant is passed out of the at least one sealant container into the sealant transport channel;
    F) feeding sealant from the at least one sealant container into the pneumatic vehicle tire by means of the compressed air from the compressed-air source, such that the puncture in the pneumatic vehicle tire is at least partially sealed by the sealant delivered into the pneumatic vehicle tire.

15. The device according to claim 1, wherein the movable switchover element is movable between:
    a bypass position, in which the movable switchover element prevents compressed-air flow from passing from the compressed-air transport channel to the at least one sealant connection, and permits compressed-air to pass via the bypass portion from the compressed-air transport channel into the sealant transport channel without flowing through the internal channel;
    an activation position, in which the movable switchover element permits compressed-air flow to pass through the internal channel to the at least one sealant connection, prior to the severing portion severing the seal; and
    a seal severing position, in which the severing portion severs the seal and the movable switchover element permits compressed-air flow to pass through the internal channel, through the at least one sealant connection and into the sealant container to force sealant into the sealant transport channel.

16. A device comprising:
    a compressed gas inlet connection configured to connect to a compressed-air source,
    a sealant connection configured to connect to a sealant container containing a sealant,
    a sealant transport channel configured to transport the sealant dispersed from the sealant container via the sealant connection into a pneumatic vehicle tire,
    a compressed-air transport channel fluidly connecting the compressed gas inlet connection to the sealant connection and/or to the sealant transport channel;
    a seal piercer that is movable at least in the compressed-air transport channel, the seal piercer having a seal piercing portion configured to pierce a seal that contains the sealant in the sealant container, and the seal piercer carrying one or more sealing surfaces that interact with one or more surfaces of the compress-air transport channel to control compressed-air flow from the compressed gas inlet connection to the sealant connection and/or to the sealant transport channel;
    wherein the seal piercer is movable between at least:
    a bypass mode, in which the one or more sealing surfaces interact with the one or more surfaces of the compress-air transport channel to prevent compressed-air flow from passing from the compressed gas inlet connection to the sealant connection, and in which the seal piercer permits compressed-air flow to pass from the compressed gas inlet connection to the sealant transport channel for filling the pneumatic tire with compressed-air; and
    a sealant mode, in which the seal piercing portion pierces the seal and the seal piercer permits compressed-air flow to pass from the compressed gas inlet connection into the sealant container via the sealant connection, and also permits sealant to flow from the sealant container through the sealant connection to the sealant transport channel.

* * * * *